Patented Dec. 9, 1952

2,621,185

UNITED STATES PATENT OFFICE 2,621,185

PYRIDINIUM QUATERNARY AMMONIUM COMPOUNDS

Edgar C. Britton, Midland, Mich., and John N. Hansen, Albert Lea, Minn., assignors to The Dow Chemical Company, Midland, Mich., a corporation of Delaware No Drawing. Application October 21, 1949, Serial No. 122,845

4 Claims. (Cl. 260—297)

This invention relates to quaternary amine compounds and is particularly concerned with pyridinium and gamma-picolinium halides.

The new compounds have the following formula:

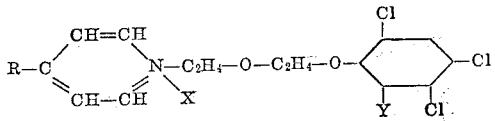

wherein R represents hydrogen or a methyl radical, X represents chlorine or bromine, and Y represents chlorine or hydrogen. Representative members of the above compound class have been prepared and found to be readily soluble in water and somewhat soluble in many organic solvents. The new compounds and compositions thereof with suitable carriers are useful as bactericides, fungicides, germicides, insecticides, and as constituents of veterinary remedies.

The new compounds may be prepared by reacting pyridine or gamma-picoline with a suitable ether halide such as trichloro- or tetrachlorophenoxy-ethoxy-ethyl chloride or bromide. In carrying out the preparation, the nitrogen base and ether halide are mixed together and heated to a reaction temperature. Suitable inert organic solvents may be employed as reaction media if desired. It is generally sufficient to dissolve the reactants one in the other and to heat and stir the mixture until reaction is completed. The reactants preferably are combined in approximately equimolecular proportions.

When the reaction is completed, the product is treated to separate out unreacted amine and ether halide and undesired by-products. This is conveniently accomplished by extracting the crude reaction mixture with selective solvents for the amine halide or for the amine and ether halide. Similarly, there may be employed a series of selective precipitations of the product using such solvents or solvent pairs as retain uncombined reactants in solution. Where the amine halide compound is a solid, recrystallization accomplishes the desired purification. If desired, the product may be clarified as by treatment with activated charcoal. The final product is dried to remove traces of water and solvent.

The preferred temperature of reaction varies with the particular reactants employed. In general, a temperature of from about 60° C. to the decomposition temperature of the mixture gives satisfactory results. One mode of operation includes heating the mixture of reactants to its boiling temperature and under reflux. A further convenient procedure is to heat the reaction mixture on a steam bath so as to operate at a temperature of 98°–100° C. The time of heating varies inversely with the temperature. 2 or 3 hours may be sufficient to complete the reaction at the boiling temperature of the reaction mixture, whereas several days may be required when operating at lower temperatures.

The following examples illustrate the invention but are not to be construed as limiting:

*Example 1.—2-[2-(2,3,4,6-tetrachlorophenoxy)-ethoxy]-ethyl gamma-picolinium chloride*

33.8 grams of 2-[2-(2,3,4,6-tetrachlorophenoxy)-ethoxy]-ethyl chloride and 9.3 grams of gamma-picoline were mixed together and heated to boiling temperature and under reflux for 6.5 hours. The resulting crude mixture was dissolved in 400 milliliters of hot ethyl alcohol (absolute) and thereafter cooled. A small amount of an insoluble by-product separated out of solution and was removed by filtration of the mixture. The filtrate was concentrated by heating on a steam bath and thereafter diluted with diethyl ether, whereupon a dark oil separated out of solution. The mixed solvents were decanted away from the oil, and the latter was again taken up in hot alcohol and thrown down by dilution of the solution with diethyl ether. The oil was then recovered and placed in a vacuum desiccator to remove residual traces of solvent. The resulting product consisted essentially of 2-[2-(2,3,4,6-tetrachlorophenoxy)-ethoxy]-ethyl gamma-picolinium chloride as a dark fluid oil miscible in all proportions with water, somewhat soluble in ethyl alcohol, and difficultly soluble in methyl alcohol and diethyl ether.

*Example 2.—2-[2-(2,3,4,6-tetrachlorophenoxy)-ethoxy]-ethyl pyridinium chloride*

169.25 grams (0.5 mol) of 2-[2-(2,3,4,6-tetrachlorophenoxy)-ethoxy]-ethyl chloride and 39.5 grams (0.5 mol) of pyridine were mixed together and heated for 3 days on a steam bath at a temperature of 98°–100° C. The resulting crude mixture was dissolved in 200 milliliters of chloroform. This solution was diluted with petroleum ether to precipitate an oily product of reaction. The oil was separated, washed several times with warm petroleum ether, and redissolved in chloroform. The chloroform solution was warmed on a hot-water bath and under reduced pressure to recover the solvent. As a residue from this operation there was obtained 164 grams of a product consisting essentially of 2-[2-(2,3,4,6-tetrachlorophenoxy)-ethoxy]-ethyl pyridinium chloride as a dark oil readily soluble in water but insoluble in petroleum ether. Aqueous solutions of this material tended to foam on agitation.

*Example 3.—2-[2-(2,4,5-trichlorophenoxy)-ethoxy]-ethyl pyridinium chloride*

47.5 grams (0.156 mol) of 2-[2-(2,4,5-trichlorophenoxy)-ethoxy]-ethyl chloride (melting at 60° C.) and 12.4 grams (0.156 mol) of pyridine were mixed together and heated at 98° C. for a period of 4 days. The crude mixture was dissolved in 55 milliliters of hot chloroform and this solution diluted with 250 milliliters of acetone. A solid product crystallized from the mixture on cooling. The resulting dispersion was cooled with ice and filtered and the residue washed twice with 150-milliliter portions of acetone. As a product from this operation there was obtained 43 grams of 2-[2-(2,4,5-trichlorophenoxy)-ethoxy]-ethyl pyridinium chloride as a white crystalline substance melting at 137°–140° C. This product was readily soluble in water and chloroform and difficultly soluble in acetone.

By reacting other suitable ether halides substantially as described in the foregoing examples, other pyridinium and gamma-picolinium compounds are obtained. Thus, 2-[2-(2,3,4,6-tetrachlorophenoxy)-ethoxy]-ethyl gamma picolinium bromide, 2-[2-(2,4,5-trichlorophenoxy)-ethoxy]-ethyl pyridinium bromide, and the like are obtained by reaction of the ether bromides with pyridine or gamma-picoline.

The ether halides as here employed are conveniently produced by reacting together 2,4,5-trichlorophenol or 2,3,4,6-tetrachlorophenol with $\beta,\beta'$-dibromo- or $\beta,\beta'$-dichloro-diethyl ether in the presence of aqueous alkali. In carrying out the reaction, the mixture of water, alkali, and organic reactants is heated to a temperature approaching the boiling temperature of the mixture and is thereafter cooled. The desired ether compounds are separated from the reaction mixture as by extraction and fractional distillation.

The new pyridinium and gamma-picolinium compounds have marked parasiticidal properties. Thus, 2-[2-(2,4,5-trichlorophenoxy)-ethoxy]-ethyl pyridinium chloride may be employed in aqueous solution to treat cotton fabrics for the control of mildew. 10-ounce cotton duck containing 1.5 per cent by weight of the pyridinium compound is protected against *Chaetomium globosum*.

2-[2-(2,3,4,6-tetrachlorophenoxy)-ethoxy]-ethyl pyridinium chloride at 0.5 pound per 100 gallons of water is applied to mature cranberry bean plants infested with bean mildew. As a result of this treatment a 90 per cent control is accomplished. The compound is also effective against *Rhizopus nigricans* at a concentration of from 0.1 to 0.25 per cent by weight in media normally supporting the growth of the organism.

A further utility for the compounds is found in their efficacy as constituents of veterinary remedies. Thus, 2-[2-(2,3,4,6-tetrachlorophenoxy)-ethoxy]-ethyl pyridinium chloride is employed in conventional composition for the dosing of chickens. At 100 milligrams of the toxic ingredient per bird, 100 per cent control is obtained against roundworm and related organisms.

The present application is a continuation-in-part of our copending application Serial No. 611,704, filed August 20, 1945.

We claim:

1. A quaternary amine compound having the formula

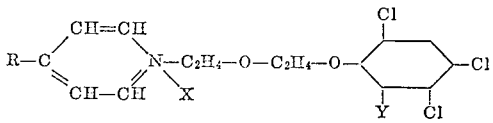

wherein R is selected from the group consisting of hydrogen and the methyl radical, X is selected from the group consisting of chlorine and bromine, and Y is selected from the group consisting of chlorine and hydrogen.

2. 2-[2-(2,3,4,6-tetrachlorophenoxy)-ethoxy]-ethyl gamma-picolinium chloride.

3. 2-[2-(2,3,4,6-tetrachlorophenoxy)-ethoxy]-ethyl pyridinium chloride.

4. 2-[2-(2,4,5-trichlorophenoxy)-ethoxy]-ethyl pyridinium chloride.

EDGAR C. BRITTON.
JOHN N. HANSEN.

REFERENCES CITED

The following references are of record in the file of this patent:

UNITED STATES PATENTS

| Number | Name | Date |
|---|---|---|
| 2,295,504 | Shelton | Sept. 8, 1942 |
| 2,299,782 | Allen et al. | Oct. 27, 1942 |
| 2,336,465 | Buck et al. | Dec. 14, 1943 |